(12) United States Patent
Jakubowski et al.

(10) Patent No.: US 9,719,219 B2
(45) Date of Patent: Aug. 1, 2017

(54) HELICOPTER LANDING DECK

(75) Inventors: Martin Jakubowski, London (GB);
Silvestro Caruso, London (GB);
Luciano Caioli, London (GB)

(73) Assignee: Condor Wind Energy Limited, London (GB)

(*) Notice: Subject to any disclaimer, the term of this patent is extended or adjusted under 35 U.S.C. 154(b) by 648 days.

(21) Appl. No.: 14/115,403

(22) PCT Filed: May 4, 2012

(86) PCT No.: PCT/IB2012/001041
§ 371 (c)(1),
(2), (4) Date: Apr. 14, 2014

(87) PCT Pub. No.: WO2012/150502
PCT Pub. Date: Nov. 8, 2012

(65) Prior Publication Data
US 2014/0217238 A1 Aug. 7, 2014

Related U.S. Application Data

(60) Provisional application No. 61/482,574, filed on May 4, 2011.

(51) Int. Cl.
*B63H 9/00* (2006.01)
*E01F 3/00* (2006.01)
(Continued)

(52) U.S. Cl.
CPC ............... *E01F 3/00* (2013.01); *F03D 13/40* (2016.05); *F03D 80/00* (2016.05); *F03D 80/50* (2016.05);
(Continued)

(58) Field of Classification Search
CPC .......... F03D 1/003; F03D 1/005; F03D 1/065; F03D 1/0625; F03D 7/0268; F03D 8/00;
(Continued)

(56) References Cited

U.S. PATENT DOCUMENTS 4,180,369 A * 12/1979 Ottosen ..................... F03D 1/00
                                                                   415/208.1
4,435,646 A    3/1984 Coleman et al.
(Continued)

FOREIGN PATENT DOCUMENTS

CN     201771692 U    3/2011
DE     20205396 U1   11/2002
(Continued)

OTHER PUBLICATIONS

Machine Translation of EP1134410 (retrieved from EPO website on May 28, 2016).*
(Continued)

*Primary Examiner* — Jessica Cahill
(74) *Attorney, Agent, or Firm* — Themis Law

(57) ABSTRACT

The invention generally relates to two-bladed turbine nacelles and platforms integrated into the nacelle structure. In certain embodiments, the invention provides an assembly encompassing a nacelle that houses a two-bladed turbine and a hoisting platform. The hoisting platform is integrated into the structure of the nacelle so as to form the roof of the nacelle.

11 Claims, 9 Drawing Sheets

(51) Int. Cl.
*F03D 80/00* (2016.01)
*F03D 13/40* (2016.01)
*F03D 80/50* (2016.01)

(52) U.S. Cl.
CPC ....... *F05B 2240/14* (2013.01); *F05B 2240/95* (2013.01); *Y02B 10/30* (2013.01); *Y02E 10/721* (2013.01); *Y02E 10/726* (2013.01)

(58) Field of Classification Search
CPC ....... F03D 9/002; E04H 152/10; E04H 12/28; E01F 3/00; F05B 2240/14; F05B 2240/95; Y02B 10/30; Y02E 10/721; Y02E 10/722; Y02E 10/726
See application file for complete search history.

(56) References Cited

U.S. PATENT DOCUMENTS

| | | | |
|---|---|---|---|
| 4,439,105 A | 3/1984 | Hohenemser | |
| 4,565,929 A | 1/1986 | Baskin et al. | |
| 4,703,189 A | 10/1987 | DiValentin et al. | |
| 4,815,936 A | 3/1989 | Stoltze et al. | |
| 5,354,175 A * | 10/1994 | Coleman | F03D 1/0658 416/134 R |
| 6,361,275 B1 | 3/2002 | Wobben | |
| 6,420,795 B1 | 7/2002 | Mikhail et al. | |
| 2002/0047277 A1 | 4/2002 | Willis et al. | |
| 2003/0068104 A1 | 4/2003 | Loftus | |
| 2004/0151584 A1 | 8/2004 | Blakemore | |
| 2006/0070435 A1 | 4/2006 | LeMieux et al. | |
| 2007/0110578 A1 * | 5/2007 | Stommel | F03D 1/065 416/132 B |
| 2010/0133827 A1 | 6/2010 | Huang et al. | |
| 2010/0203983 A1 | 8/2010 | Stites | |
| 2010/0226772 A1 | 9/2010 | Deering | |
| 2011/0097202 A1 * | 4/2011 | de Buhr | F03D 1/003 415/201 |
| 2014/0212288 A1 | 7/2014 | Jakubowski et al. | |
| 2014/0217238 A1 | 8/2014 | Jakubowski et al. | |
| 2014/0217742 A1 | 8/2014 | Caruso et al. | |
| 2014/0219796 A1 | 8/2014 | Caruso et al. | |
| 2014/0219801 A1 * | 8/2014 | Nyvad | F03D 80/80 416/95 |
| 2014/0226926 A1 | 8/2014 | Caruso et al. | |

FOREIGN PATENT DOCUMENTS

| | | | | |
|---|---|---|---|---|
| DE | 102010055873 A1 * | 6/2012 | | E01F 3/00 |
| EP | 0995904 A2 | 4/2000 | | |
| EP | 1134410 A1 | 9/2001 | | |
| EP | 1890034 A1 | 2/2008 | | |
| EP | 2128431 A2 | 12/2009 | | |
| EP | 2302206 A1 | 3/2011 | | |
| GB | 2107794 A | 5/1983 | | |
| GB | WO 2010145666 A1 * | 12/2010 | | B64B 1/06 |
| JP | 2006-207502 A | 8/2006 | | |
| WO | 02/079647 A1 | 10/2002 | | |
| WO | 2009/080047 A2 | 7/2009 | | |
| WO | 2009/132671 A2 | 11/2009 | | |
| WO | 2010/072190 A2 | 7/2010 | | |
| WO | 2010/128378 A2 | 11/2010 | | |
| WO | 2011/042369 A2 | 4/2011 | | |
| WO | 2012/150502 A1 | 11/2012 | | |
| WO | 2012/150502 A4 | 11/2012 | | |
| WO | 2012/153185 A1 | 11/2012 | | |
| WO | 2012/153197 A2 | 11/2012 | | |
| WO | 2012/153197 A3 | 11/2012 | | |
| WO | 2012/153197 A4 | 11/2012 | | |
| WO | 2012/160446 A2 | 11/2012 | | |
| WO | 2012/160446 A3 | 11/2012 | | |
| WO | 2012/160446 A4 | 11/2012 | | |
| WO | 2012/164387 A1 | 12/2012 | | |
| WO | 2012/164387 A4 | 12/2012 | | |
| WO | 2013/027127 A4 | 12/2012 | | |
| WO | 2013/027127 A2 | 2/2013 | | |

OTHER PUBLICATIONS

Carlin et al., 2001, The History and State of the Art of Variable-Speed Wind Turbine Technology, National Renewable Energy Laboratory, (68 pages).
IEA Wind 1989 Annual Report.
IEA Wind 1990 Annual Report.
IEA Wind 1992 Annual Report.
IEA Wind LS WECS 1988 Annual Report.
IEA Wind LS WECS 1989 Annual Report.
International Preliminary Search Report on Patentability for PCT/IB2012/001015 with the date of issuance of Nov. 12, 2013, (8 pages).
International Preliminary Search Report on Patentability for PCT/IB2012/001041 with the date of issuance of Nov. 5, 2013, (14 pages).
International Preliminary Search Report on Patentability for PCT/IB2012/001106 with the date of issuance of Dec. 2, 2013, (10 pages).
International Preliminary Search Report on Patentability for PCT/IB2012/001118 with the date of issuance of Nov. 26, 2013, (13 pages).
International Preliminary Search Report on Patentability for PCT/IB2012/001183 with the date of issuance of Nov. 12, 2013, (14 pages).
International Preliminary Search Report on Patentability for PCT/IB2012/002704 with the date of issuance of Nov. 12, 2013, (15 pages).
Wind Stats Report 2011.

* cited by examiner

HELICOPTER LANDING DECK

REFERENCE TO RELATED APPLICATIONS

This application claims priority to U.S. Provisional Application No. 61/482,774, filed May 4, 2011, the content of which is herein incorporated by reference in its entirety.

FIELD OF THE INVENTION

The invention generally relates to offshore wind turbines.

BACKGROUND

Wind power refers to the conversion of wind energy into a useful form of energy, such as electricity. Wind energy is an attractive power source that is an alternative to fossil fuels because it is plentiful, renewable, widely distributed, clean, and produces no greenhouse gas emissions. Wind energy currently accounts for about 1.5% of worldwide electricity usage, and approximately eighty countries around the world use wind power on a commercial basis (World Wind Energy Report 2008: Report, World Wind Energy Association, February 2009; and Worldwatch Institute: Wind Power Increase in 2008 Exceeds 10-year Average Growth Rate, May 2009). Further, world wind generation capacity has more than quadrupled between the years 2000 and 2006, doubling about every three years.

Offshore wind turbines harness the energy of powerful winds native to deep sea waters to generate electricity. Access to these turbines is critical for their continued maintenance, however, the harsh waters of the deep sea make reaching the turbine by ship exceedingly difficult. A ship might not be able to reach a wind turbine for several weeks due to inclement weather conditions. The resulting downtimes due to lack of repair can cut significantly into energy production.

Alternate means of reaching the turbine include travel by helicopter, which has its own challenges. Helicopter decks associated with three-bladed wind turbines present substantial risks due to the constant presence of at least one of the three turbine blades extending vertically at any given time. A helicopter can potentially collide with these vertically-oriented blades during operations. Attempts to mitigate this danger include mounting the helicopter deck to the rear of the nacelle, away from the blades. A mounted helideck, however, can increase manufacturing cost, increase the weight of the nacelle, and when the deck is positioned to the rear of the nacelle, the action of the wind could produce dynamic excitation. Moreover, the danger due to the vertically-positioned blade is still present. Accordingly, there is a need for a helicopter deck and associated nacelle with improved safety, better stability, and lower production costs.

SUMMARY

The invention generally relates to nacelles with an integrated helicopter deck. It has been found that a helicopter deck integrated into the structure of a nacelle housing a two-blade turbine offers improved safety over decks mounted at the rear of a three-blade turbine nacelle. Unlike a three-bladed turbine, the opposing blades of a two-bladed turbine can be positioned along a horizontal plane. With the blades positioned horizontally, the risk of colliding into a vertically extending blade is eliminated and access to the helicopter deck is facilitated.

In certain embodiments of the invention, an assembly is provided. The assembly includes a nacelle, wherein the nacelle houses a two-bladed turbine. The turbine can be brought to a stationary mode with both blades in a horizontal position. Furthermore, the rotor of the two-bladed turbine can be locked so that blades are fixed in a horizontal position. The assembly also includes a hoisting platform. The hoisting platform is integrated into the structure of the nacelle such that the hoisting platform forms the roof of the nacelle. In certain embodiments of the invention, the hoisting platform is a helicopter hoisting platform, also known in the art as a helicopter deck or a helideck. The helicopter hoisting platform is operably configured for the take-off and landing of a helicopter. The invention also encompasses a hoisting platform that is centrally positioned on the nacelle. The hoisting platform encompasses any shape but exemplary embodiments include platforms that are circular or essentially circular, hexagonal, or octagonal. While the hoisting platform serves as the roof of the nacelle, the area of the platform can extend beyond the area of the underlying nacelle. In addition to comprising the entire roof structure, the hoisting platform can also form a portion of the total roof structure. Whether or not the hoisting platform forms the entire roof structure of the nacelle or portion, the hoisting platform is nonetheless integrated into the roof structure and is not a separate structure that is mounted onto the nacelle.

Assemblies in accordance with the invention offer numerous benefits. The invention provides a means of a safe access to the nacelle by integrating a helicopter deck into the roof of a two-bladed wind turbine nacelle, in which the blades of the turbine can be stationed along a horizontal axis. Without the danger stemming from a vertically-positioned blade, the helicopter deck no longer needs to be positioned at the rear of the nacelle. The deck, for instance, can be centrally positioned on the nacelle. The central positioning of the deck as well as its integration into the nacelle roof allows for a lighter and more stable structure when compared to the rear-mounted platform arrangement associated with three-bladed turbines. In addition to being safer than helidecks associated with existing three-bladed turbines, the invention is also more economical. Because the helicopter deck is integrated into the nacelle, no costly installation of a separate helideck is necessary. Furthermore, although certain aspects of the invention specifically include a helicopter deck, the invention also encompasses loading or hoisting decks in general. The invention, for example, encompasses decks capable of supporting equipment or personnel dropped off by helicopter. Accordingly, a helicopter does not necessarily need to land on the deck. The absence of vertical obstacles allows helicopters to drop such cargo onto the deck without landing and in improved safety conditions. Additional aspects of the invention will become evident upon reading the present disclosure.

DETAILED DESCRIPTION

Figure 1A:
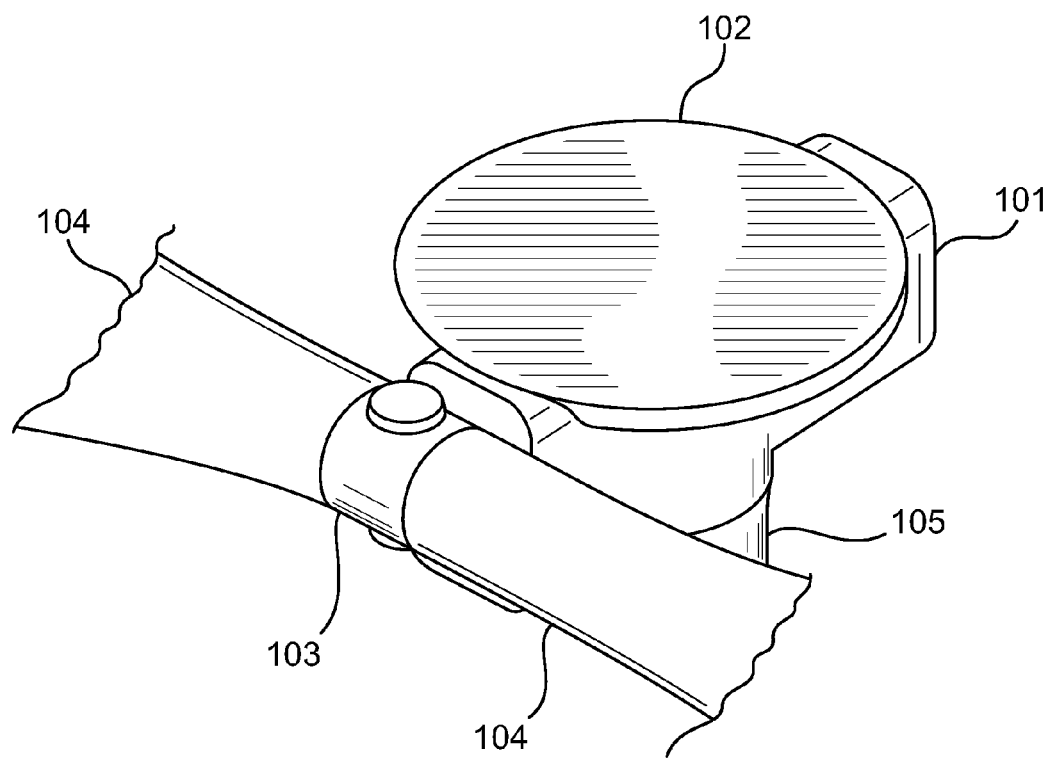
FIGS. 1A, 1B, 1C, and 1D are angled, side, front, and top views, respectively, of an embodiment of the invention.
Figure 1B:
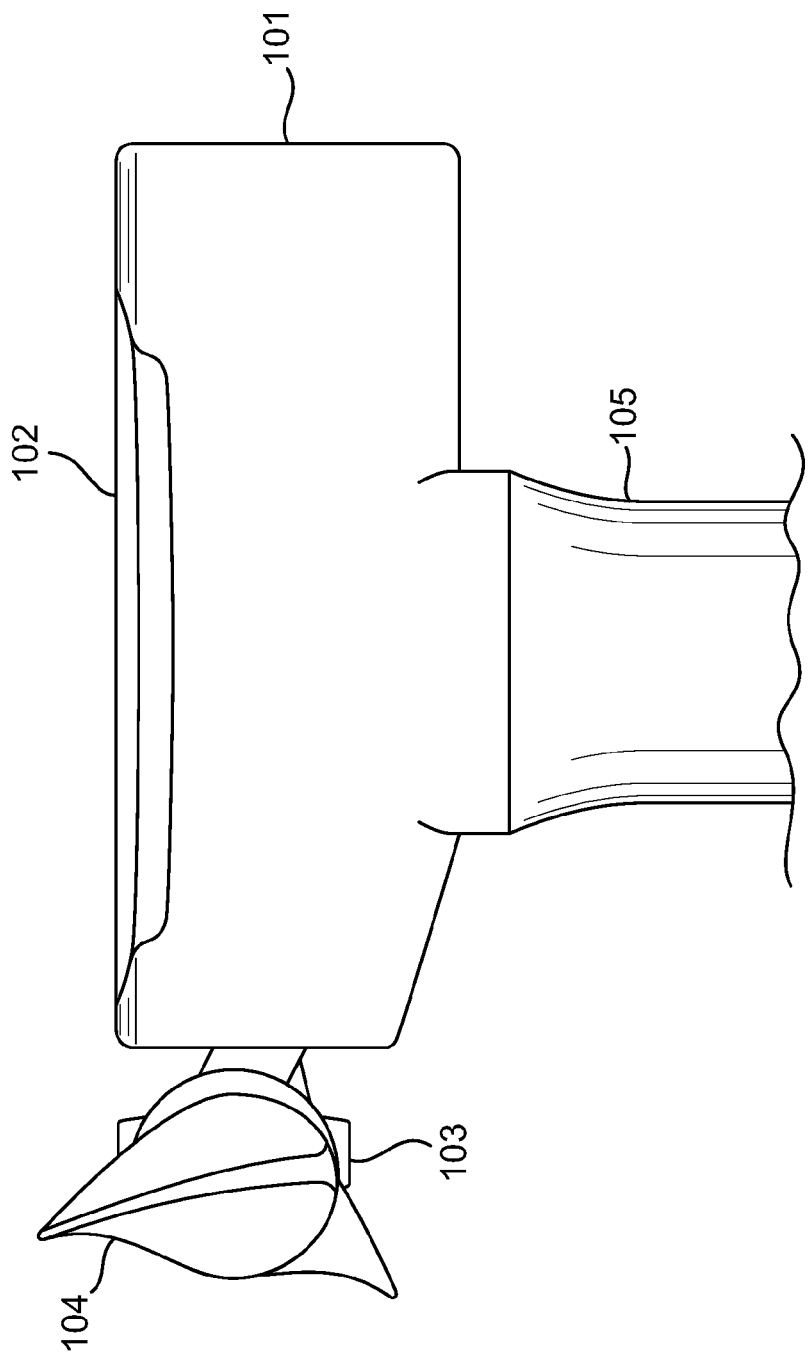
Figure 1C:
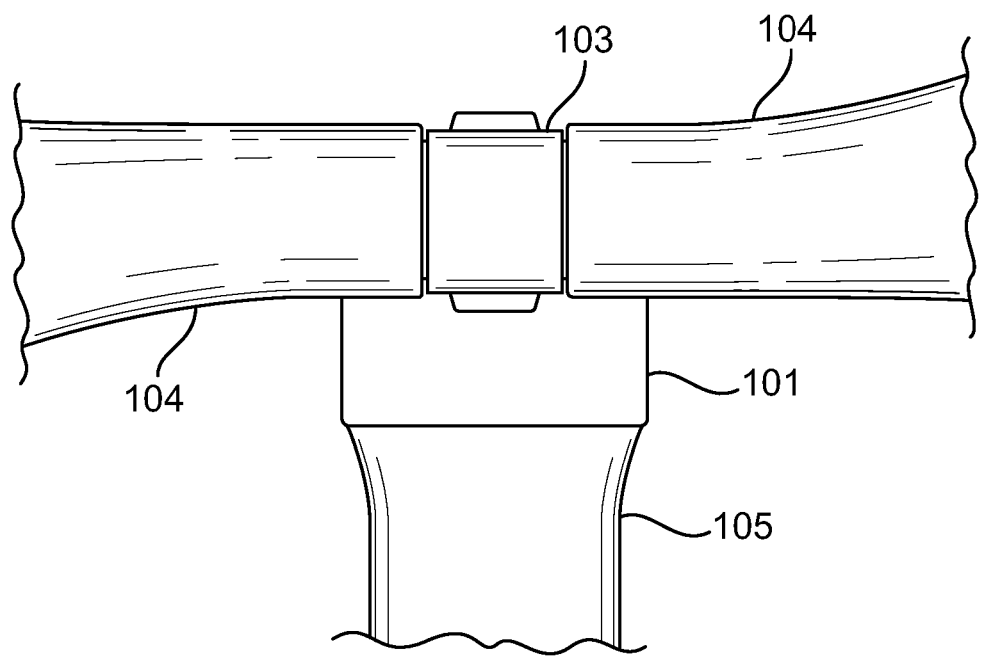
Figure 1D:
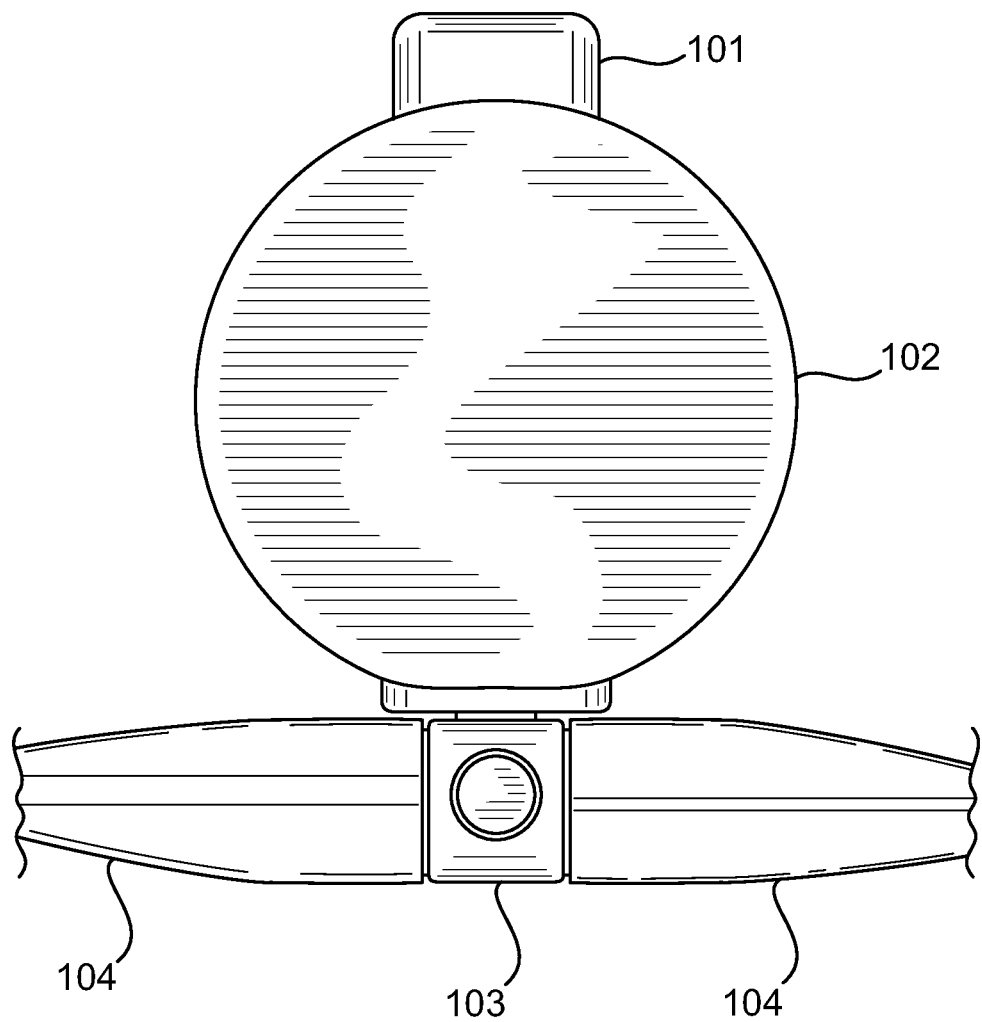
Figure 1E:
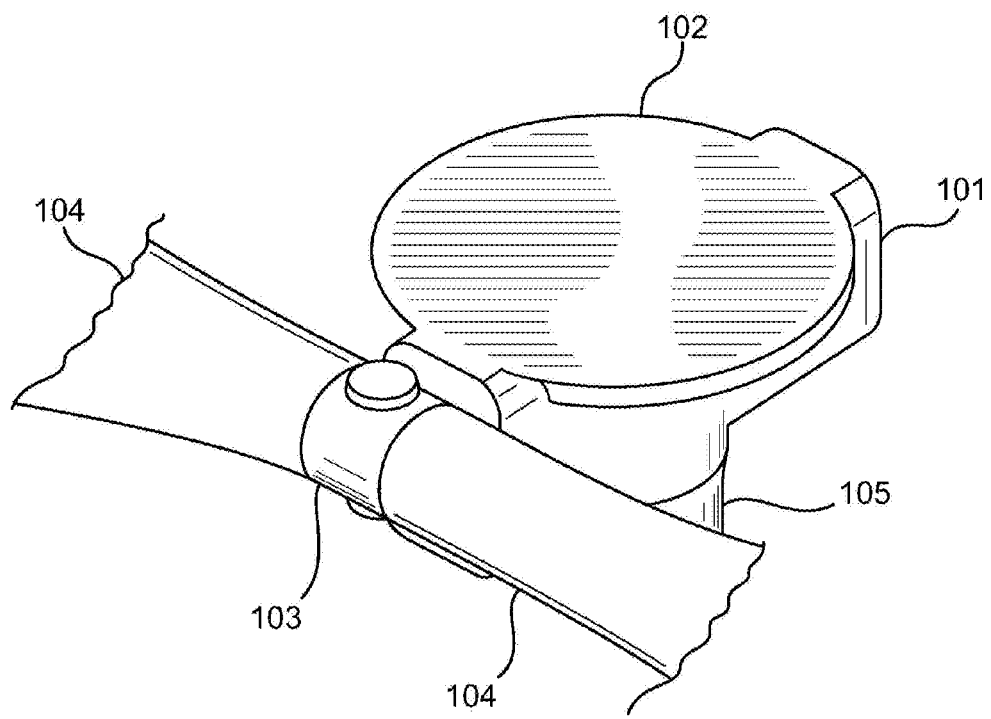
FIGS. 1E, 1F, and 1G are angled, side, and top views, respectively, of another embodiment of the invention.
Figure 1F:
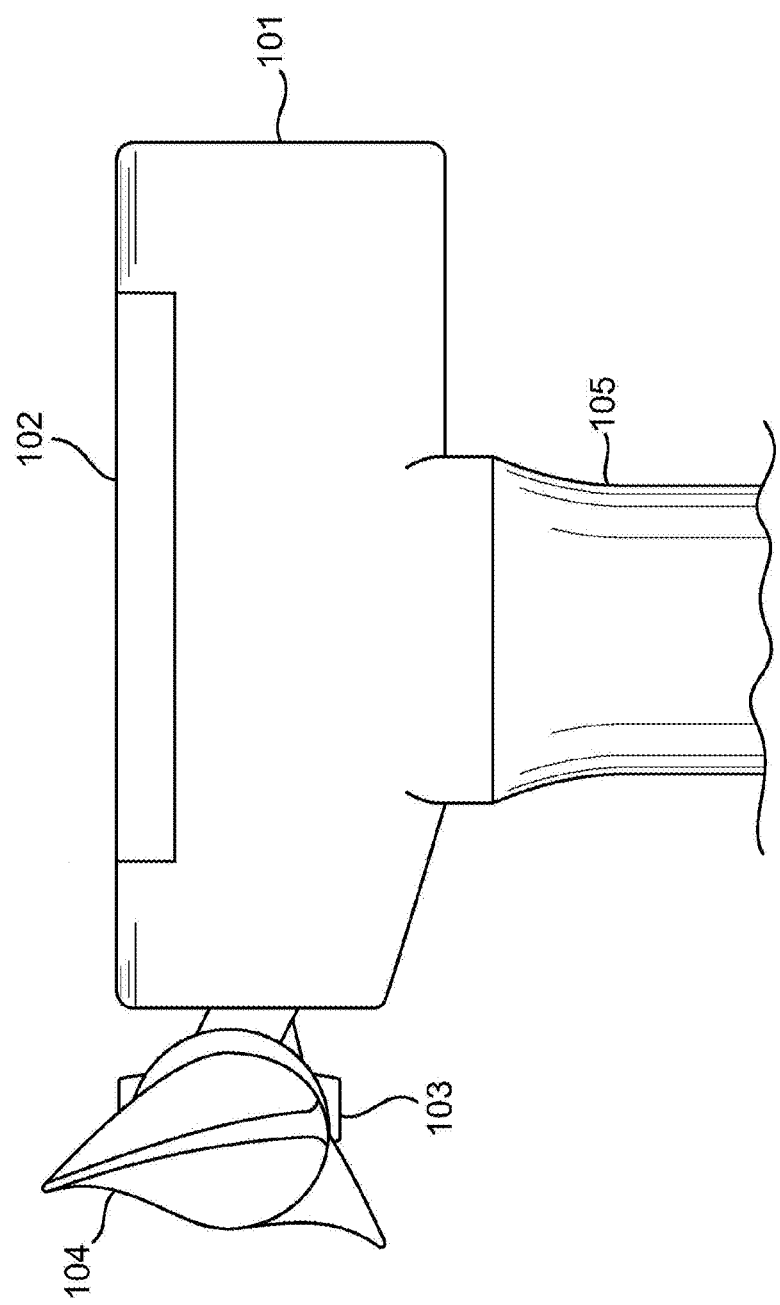
Figure 1G:
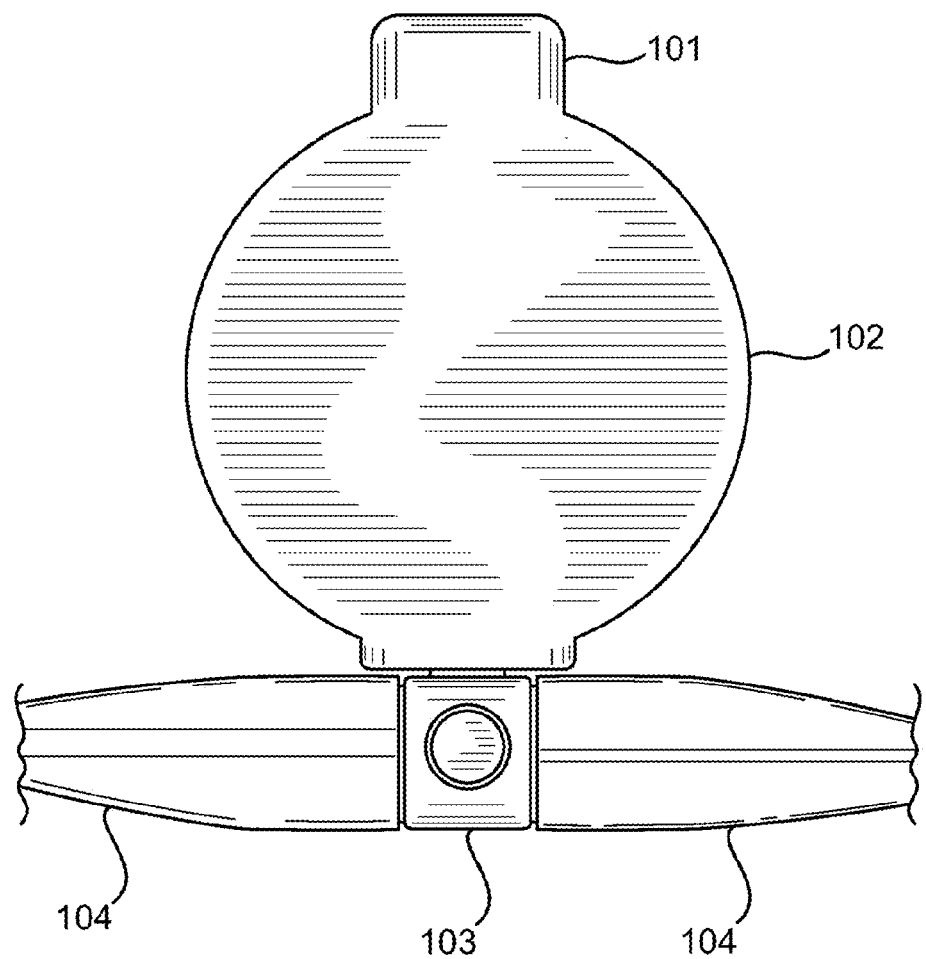

The invention provides an assembly encompassing a nacelle that houses a two-bladed turbine and a hoisting platform. The hoisting platform is integrated into the structure of the nacelle so as to form the roof of the nacelle. The integration of the hoisting platform into the nacelle along with the two-bladed turbine results in the enhanced stability of the nacelle and safer means of accessing the nacelle.

In certain embodiments of the invention, an assembly is provided. The assembly includes a nacelle and a hoisting platform. The nacelle, according to the invention, houses a two-bladed wind turbine. Wind turbines are already known in the art. As contemplated by the invention, the two blades of the turbine are 180.degree. apart. With the two blades of the turbine oriented 180.degree. apart, the blades can be positioned along an axis that is substantially horizontal.

In typical assemblies comprising a three-bladed turbine, the turbine blades cannot be positioned so that all three blades are aligned along a substantially horizontal axis. At any given time, at least one of the blades will extend somewhat in the vertical direction. Accordingly, the vertically extending blade presents a collision hazard for a helicopter seeking to land on the nacelle. In the present invention, the two blades of the turbine can be positioned horizontally as to not present a vertically extended obstacle for a helicopter seeking to land or take-off from the nacelle.

In certain embodiments of the invention, the blades of the turbine can be locked into position once the blades are oriented along a horizontal axis. Locking the blades into a horizontal position further enhances safety as the risk of the blades returning to a vertical position is eliminated. Means of locking the blades in the horizontal position include any suitable means that does interfere with the normal functioning of the turbine. In certain embodiments, the blades are locked in a horizontal position by locking the turbine rotor once the blades are suitably positioned.

Embodiments of the present invention further encompasses a hoisting platform, i.e, a relatively flat surface or structure suitable for supporting objects. In some embodiments, the hoisting platform is operably configured to support the taking or landing of a helicopter. In other words, hoisting platforms in accordance with the invention include helicopter decks, also known as helidecks or helicopter pads. In certain embodiments, the hoisting platform can be constructed from materials that are typically used to prepare helicopter decks. In certain aspects, the material used to prepare the hoisting deck is different from the material used to prepare the nacelle. The hoisting platform can be prepared from a composite material, for instance, consistent with materials used to prepare helicopter decks. Numerous guidelines exist for the construction of helicopter decks and are readily accessible and understood by those skilled in the art. For example, the American Bureau of Shipping has published a set of guidelines concerning the structural design and safety criteria for helicopter decks. See "Helicopter Decks and Facilities (Helidk and Helidk (SRF)): Guide For The Class Notation," April 2008, Updated November 2010. In certain aspects, hoisting platforms also include structures suitable for supporting equipment or personnel that may be loaded onto a helicopter or dropped off from a helicopter. The shape of the hoisting platform encompasses any shape that provides a surface suitable for supporting a load. For example, the hoisting platform can have a rectangular shape or a square shape. In other embodiments, the area of the hoisting platform is hexagonal or octagonal. In yet another embodiment, the area of the hoisting platform is circular or essentially circular in shape. In certain embodiments, the arrangement of structural features facilitates the convenient delivery of service personnel and equipment to the hoisting platform after the turbine has been brought to a stationary mode with both blades aligned horizontally.

In certain embodiments of the invention, the hoisting platform is integrated into the structure of the nacelle and is not a separate structure that is mounted onto the nacelle body. In one aspect, the integrated hoisting platform forms the roof of the nacelle. In certain aspects, the hoisting platform comprises an upmost surface of the nacelle upon integration into the nacelle. Compared to typical assemblies in which a helicopter deck is a separate structure mounted onto the nacelle, assemblies in accordance with the present invention are potentially lighter and more economical to assemble. In certain embodiments, the hoisting platform encompasses the entire roof of the nacelle. In other embodiments, the hoisting platform, although still integrated into the roof of the nacelle, encompasses an area less than the entire roof of the nacelle. Portions of the hoisting platform can extend beyond the area of the nacelle underneath. In certain embodiments, the hoisting platform does not encompass the entire roof of the nacelle, but still contain portions that extend beyond the area of the nacelle underneath.

Because the hoisting platform is integrated into a nacelle in which the blades can be fixed horizontally, the platform no longer needs to be confined to the rear of the platform. In typical assemblies comprising three-bladed turbines, the threat of a vertically extended blade usually means that any helicopter deck associated with the nacelle is placed as far away from the blades as possible, often towards the rear of the nacelle. Because the blades associated with the present invention can be fixed in a horizontal position, the threat of a vertically extended blade is eliminated and the hoisting platform can be repositioned as needed.

In certain embodiments, the hoisting platform is centrally positioned on the nacelle. In this case, the hoisting platform is positioned substantially at the center of the nacelle body. In certain embodiments, the positioning of the hoisting platform allows the platform to be situated over the structure supporting the nacelle itself. In further embodiments, the hoisting platform is positioned directly over the supporting structure. In this instance, the center of the hoisting platform is substantially aligned over the center of the supporting structure. In certain embodiments, the central positioning of the hoisting platform may result in the platform being positioned over the supporting structure. The central positioning of the integrated hoisting platform better facilitates the balancing of the nacelle over the supporting structure. This can result in reduced stress to the nacelle itself during helicopter landing. Unlike prior art assemblies, in certain embodiments of the invention, the hoisting platform can be positioned over a point where the nacelle is most structurally sound.

Embodiments of an assembly in accordance with the invention is presented from different perspectives in FIGS. 1A-1G. The assembly includes a nacelle 101 and a hoisting platform 102. The nacelle 101 houses a two-bladed wind turbine 103, in which the blades 104 of the turbine 103, can be positioned horizontally. In certain embodiments, the turbine 103 can be locked with the blades 104 in the horizontal position. In the embodiment depicted in FIGS. 1E-1G, the hoisting platform 102 is integrated into the roof of the nacelle 101. In this embodiment, the hoisting platform 102 is a helicopter deck. In another embodiment depicted in FIGS. 1A-1D, the hoisting platform 102 is centrally positioned over the nacelle 101 and the nacelle support structure 105. In these embodiments, the hoisting platform is circular and portions of the hoisting platform 102 extend in equal lengths beyond the sides of the nacelle 101. Also as shown in these embodiments, the hoisting platform 102 comprises or is positioned over a portion of the nacelle 101 roof without necessarily encompassing the entire roof of the nacelle 101.

Figure 2A:
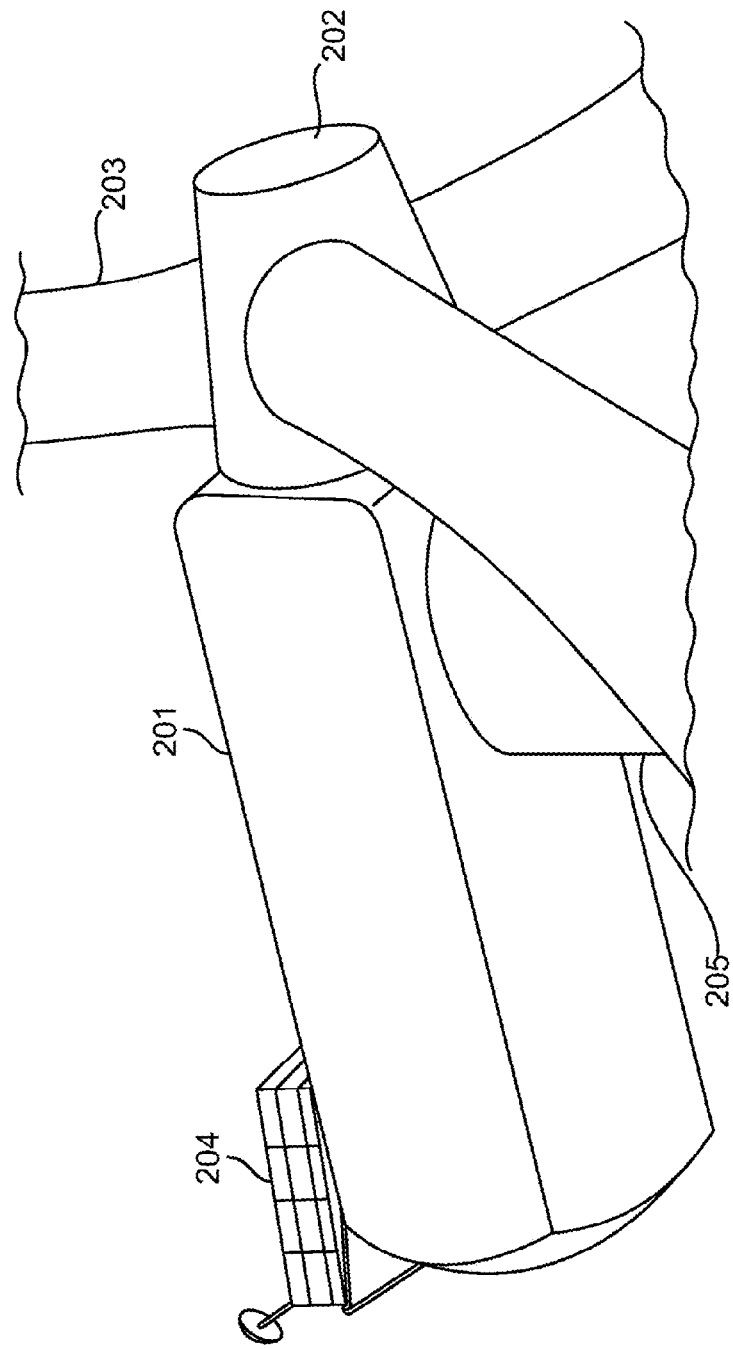
FIGS. 2A and 2B are angled and side views respectively, of a prior art helideck assembly.
Figure 2B:
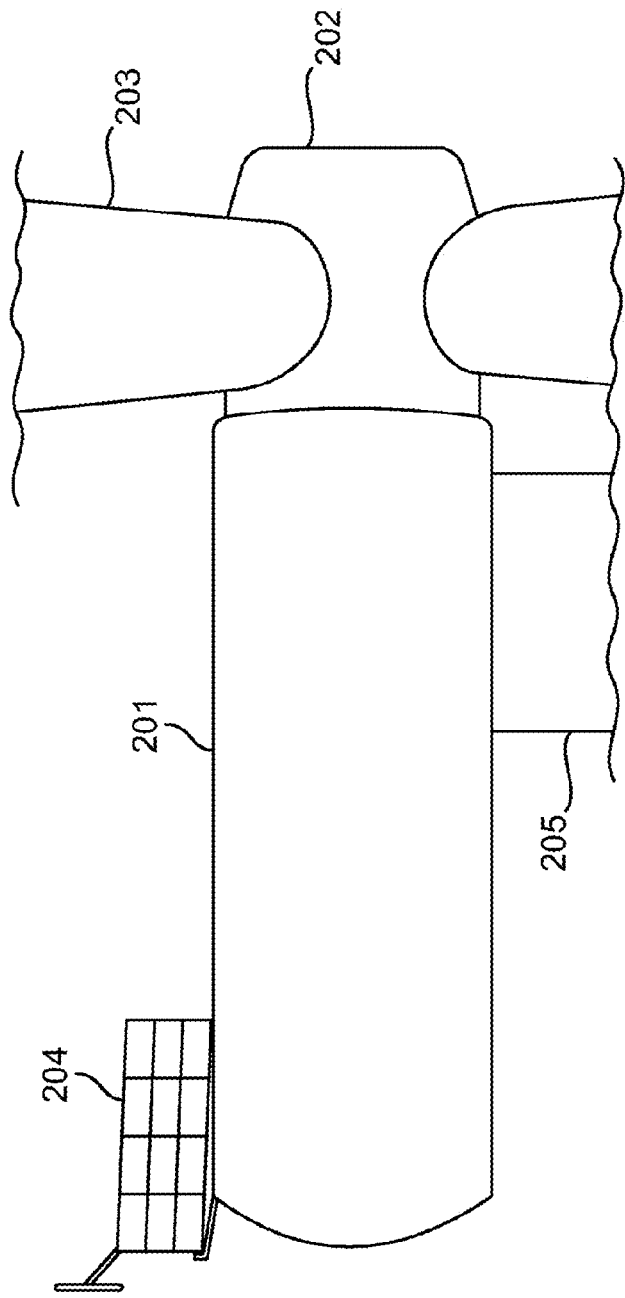

A prior art assembly is shown from different views in FIGS. 2A and 2B. The assembly includes a nacelle 201 that houses a three-bladed wind turbine 202. Because the turbine 202 has three blades, at least one blade 203 of the turbine 202 extends vertically at any given time. In other words, the blades of the three-bladed turbine 202 cannot be positioned on a completely horizontal plane. The nacelle also includes a helicopter deck 204. However, to mitigate the risk of an incoming helicopter colliding with a vertically extended blade 203, the helicopter deck 204 is mounted as far away from the blades of the turbine 202 as possible. This means mounting the helicopter deck 204 to the rear of the nacelle 201. As evident from the Figures, positioning the helicopter deck 204 to the rear of the nacelle 201 often means that the nacelle 201 is not optimally balanced over the nacelle support structure 205. In addition, the risk stemming from the vertically extended blade 203 has not been eliminated. Furthermore, the addition of a separate structure, such as a mounted helicopter deck 204, increases the overall cost of the assembly.

Taking the two sets of figures together, the benefits of the invention are apparent. A helicopter, attempting to land on the helideck encompassed by the invention, does not face the vertical obstacles associated with the prior art assemblies. As encompassed by the invention, the two blades can be oriented horizontally, permitting improved access to the helideck. In addition, because the helideck encompassed by the invention is integrated into the structure of the nacelle itself and can be centrally positioned, the assembly provided by the invention is more stable when compared to the prior art.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

The invention claimed is:

1. An assembly, the assembly comprising:
   a nacelle, wherein the nacelle houses a turbine having a plurality of blades, the plurality of blades consisting of two blades; and
   a hoisting platform,
   wherein the hoisting platform is integrated into a structure of the nacelle so that the hoisting platform constitutes at least a portion of a roof of the nacelle, and
   wherein the hoisting platform is centrally positioned on the nacelle and is not extending beyond longitudinal ends of the nacelle.

2. The assembly of claim 1, wherein the hoisting platform is operably configured for take-off and landing of a helicopter.

3. The assembly of claim 1, wherein the hoisting platform and the nacelle are constructed from different materials.

4. The assembly of claim 1, wherein the hoisting platform has a circular shape.

5. The assembly of claim 1, wherein a rotor of the turbine is operably configured to lock the blades in a horizontal position.

6. The assembly of claim 1, wherein the hoisting platform has a polygonal shape.

7. An assembly comprising:
   a nacelle, wherein the nacelle houses a turbine having a plurality of blades, the plurality of blades consisting of two blades; and
   a hoisting platform,
   wherein the hoisting platform is positioned over a roof of the nacelle and is supported by a structure that supports the nacelle roof, and
   wherein the hoisting platform is centrally positioned on the nacelle and is not extending beyond longitudinal ends of the nacelle.

8. The assembly of claim 7, wherein the hoisting platform and the nacelle are constructed from different materials.

9. The assembly of claim 7, wherein a rotor of the turbine is operably configured to lock the blades in a horizontal position.

10. The assembly of claim 7, wherein the hoisting platform has a circular shape.

11. The assembly of claim 7, wherein the hoisting platform has a polygonal shape.

* * * * *